Oct. 20, 1970 K. G. WARREN 3,535,552

CIRCUIT ARRANGEMENT FOR REVERSING THE POLARITY OF ELECTRICAL WAVE-FORM SAMPLES

Filed June 1, 1967 2 Sheets-Sheet 2

1

3,535,552

CIRCUIT ARRANGEMENT FOR REVERSING THE POLARITY OF ELECTRICAL WAVE-FORM SAMPLES

Keith George Warren, London, England, assignor to Associated Electrical Industries Limited, London, England, a British company Filed June 1, 1967, Ser. No. 642,891
Claims priority, application Great Britain, June 14, 1966, 26,539/66
Int. Cl. H03k 17/00
U.S. Cl. 307—242 4 Claims

ABSTRACT OF THE DISCLOSURE

A circuit arrangement for reversing the polarity of electrical wave-form samples, comprising two current paths connected between a constant current source and a load resistance, and having respective auxiliary current feeds, change of current in one path due to an applied sample voltage causing a change in voltage in the opposite sense across the load resistance if the auxiliary current feed of said one path is non-operative and that of the other path is operative, but causing a change in voltage in the same sense across the load resistance if the non-operative and operative states of the two auxiliary current feeds are reversed.

BACKGROUND OF THE INVENTION

This invention concerns a circuit arrangement for reversing the polarity of electrical wave-form samples, such circuit arrangement having a particular but non-exclusive application to pulse code modulation (P.C.M.) systems.

There have been proposed arrangements for the transmission of communication signals such as speech signals by pulse code modulation transmission in which, prior to encoding, all the electrical waveform samples are given the same polarity. By so doing, a considerable economy of equipment can be effected in P.C.M. transmission arrangements. However, it has been found that a highly accurate circuit arrangement is required to achieve satisfactory reversal of the polarity of electrical waveform samples of one polarity, whilst leaving with unchanged polarity electrical waveform samples of the other polarity, so that all of a series of samples to be encoded have the same polarity, immediately prior to encoding, irrespective of their original polarities. High accuracy is also required in respect of a similar circuit arrangement by which, immediately prior to decoding, a series of encoded samples all having the same polarity are reconstituted, by appropriate polarity reversal, as samples having polarities corresponding to the original polarities of the encoded electrical waveform samples.

It is an object of the present invention to provide a circuit arrangement that can fulfil those requirements.

SUMMARY OF THE INVENTION

According to the present invention a circuit arrangement for reversing the polarity of electrical waveform samples comprises first and second current paths each of which is arranged to feed a current of value $I_b$ to constant current means effective to maintain the total current fed to it from said two paths at a value $2I_b$, each of said paths having connected to it an individual current steering transistor which when conductive passes the current of value $I_b$ to the path and when non-conductive permits the path to receive the current of value $I_b$ from a load resistor which is connected in common to the two paths and through which a current of that value is arranged to flow, the arrangement also including input transistor means responsive to an applied electrical waveform sample voltage to feed a sample current $I_s$ into said first path, which sample current will be negative or positive depending on the polarity of the sample voltage so that the resultant current in said first path will become $I_b \pm I_s$, and the arrangement being such that with the current steering transistor connected to said first path nonconductive and the other current steering transistor conductive, said resultant current in said first path will flow through said load resistor to produce across this resistor a voltage change constituting an output sample voltage of reverse polarity to the applied sample voltage, whereas with the current steering transistor connected to said first path conductive and the other current steering transistor non-conductive said resultant current in said first path will cause the current in said second path, as fed through said load resistor, to change to a value appropriate for maintaining the current of value $2I_b$ through said constant current means, this change in current through the load resistor producing across the latter a voltage change constituting an output sample voltage of the same polarity as the applied sample voltage.

BRIEF DESCRIPTION OF THE DRAWINGS

In order that the invention may be more fully understood and in considering further features thereof reference will now be made by way of example to the accompanying drawings of which.

DESCRIPTION OF THE PREFERRED EMBODIMENT

Figure 1:
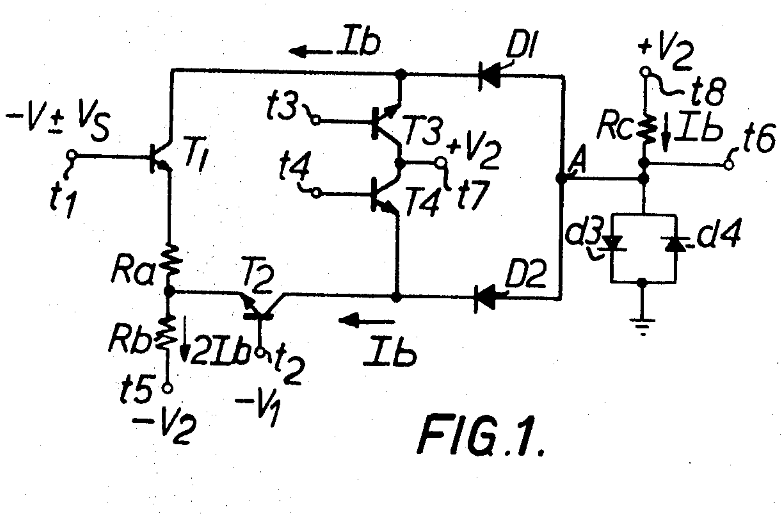
FIG. 1 shows one form of circuit arrangement conforming to the invention.

Referring to the drawings, the circuit arrangement shown in FIG. 1 comprises an input transistor T1, a second transistor T, and two current steering transistors T3 and T4. The base of transistor T1 is connected to an input terminal *t1* which has a bias voltage $-V$ applied to it and to which electrical wave-form sample voltages $\pm V_s$ can also be applied. The base of transistor T2 is connected to a reference terminal *t2* to which a reference voltage $-V_1$ is applied. The emitter of the transistor T1 is connected via two series connected resistors R*a* and R*b* to a supply terminal *t5* to which a negative supply voltage $-V_2$, more negative than both $-V$ and $-V_1$, is applied. The two transistors T1 and T2 are thus held conductive. The emitter of the transistor T2 is connected to the junction of the resistors R*a* and R*b*. The collectors of the two transistors T1 and T2 are connected via respective diodes D1 and D2 to an output terminal *t6* of the arrangement. The bases of the current steering transistors T3 and T4 are connected to respective gating terminal *t3* and *t4* to which gating potentials can be applied such that either one of these two transistors can be made conductive and the other transistor made nonconductive. As will be seen, the control of these gating potentials determines when there is to be polarity reversal and when there is to be no polarity reversal. The occasions of polarity reversal and nonreversal will depend upon the application of the circuit but in the application to be considered with reference to FIG. 3 the requirement is for reversal only with negative input signals. Clearly, however, the circuit is not limited to such an application. The collectors of the two transistors T3 and T4 are connected in common to a supply terminal *t7* to which a positive supply voltage $+V_2$ is applied, and their emitters are connected respectively to the collectors of the two transistors T1 and T2. At its output side the circuit arrangement of FIG. 1 also includes a load resistor R*c* connected between a supply terminal *t8* to which the positive supply voltage $+V_2$ is also applied, and the common connecting point A of the two diodes D1 and D2, together with two voltage limiting diodes *d3* and *d4* which are connected in parallel, in opposite senses, between the point A and earth.

Consider now the operation of the circuit arrangement of FIG. 1 to reverse the polarity of an applied electrical waveform sample voltage $\pm V_s$. In the quiescent state of the circuit arrangement, that is, with no sample voltage $\pm V_s$ present at terminal *t1*, assume in the first instance that transistor T3 is non-conductive and that transistor T4 is conductive due to the application of suitable gating potentials at terminals *t3* and *t4*. With transistor T3 nonconductive, the dode D1 is forward biased so that a current $I_b$ flows from terminal *t8* through load resistor R*c*, diode D1, transistor T1 and resistors R*a* and R*b*, to terminal *t5*. With transistor T4 conductive, the diode D2 is reverse biased, thereby blocking the current $I_b$ passing through resistor R*c*, but the conductive state of transistor T4 causes another current $I_b$ to flow from terminal *t7* through transistor T4, transistor T2, and resistor R*b* to terminal *t5*. Thus a current of value $2I_b$ flows through resistor R*b* which functions as a constant current means. If the gating potentials applied at terminals *t3* and *t4* are such that transistor T3 is conductive and transistor T4 is nonconductive, a current value of $2I_b$ will still flow through resistor R*b*, but in this second instance, since diode D1 is now reversed biased and diode D2 forward biased, this current is made up of a current $I_b$ flowing from terminal *t8* through resistor R*c*, diode D2, transistor T2 and resistor R*b*, and a current $I_b$ flowing from terminal *t7* through transistor T3, transistor T1, resistor R*a* and resistor R*b*.

As will now be considered, to provide an accurate value of current of only one polarity at its output terminal *t6* corresponding to a sample voltage of either polarity applied to its input terminal *t1*, the circuit arrangement depends for its operation upon the current through resistor R*b* being always fixed at the value $2I_b$. In this respect the accuracy of the arrangement is influenced by the slope resistance at the emitters of both the transistors T1 and T2, and hence the minimum current flowing through either of these transistors must be kept above a certain level, for example above about 5 ma., which gives a slope resistance of 5 ohms. When, in either the first or the second instance just considered, an electrical waveform sample voltage is applied to terminal *t1*, the conduction of transistor T1 will be increased or decreased, according to the polarity of the sample voltage, so that the current flowing through this transistor T1 will no longer be the current $I_b$. For example, if a negative sample voltage $-V_s$ is applied to terminal *t1*, then the decrease in the emitter current of transistor T1 will be $-V_s/Ra$, giving a signal current $-I_s$, so that the resultant current through the transistor T1 becomes $I_b-I_s$. If, as in the first instance mentioned above, the original current $I_b$ through transistor T1 was flowing from terminal *t8* via resistor R*c*, then this current $I_b$ is decreased by the value $I_s$, thereby decreasing the voltage drop across this resistor R*c* so that there is produced at output terminal *t6* a relatively positive output voltage. Thus, a negative sample voltage $-V_s$ applied at terminal *t1* results in a positive output sample voltage at terminal *t6*, that is, the polarity of the applied sample voltage has been reversed. The current flowing from terminal *t7* is controlled by that flowing in either of the emitters of transistors T3 and T4 to a value $I_b+I_s$ so that the total current through resistor R*b* remains fixed at $2I_b$. On the other hand, if, as in the second instance mentioned above, the original current $I_b$ through transistor T1 was flowing from terminal *t7* via transistor T3 then, because the current through resistor R*b* remains fixed at the value $2I_b$, the current drawn from terminal *t8* through load resistor R*c*, diode D2 and transistor T2 must increase to $I_b+I_s$. Thus, there is an increased voltage drop across load resistor R*c*, so that there is produced at output terminal *t6* a relatively negative output voltage. Therefore, with transistor T3 conductive and transistor T4 nonconductive, a negative sample voltage $-V_s$ applied at terminal *t1* results in a negative output sample voltage at terminal *t6* that is, the polarity of the applied sample voltage is unchanged.

It will be apparent that with transistor T3 nonconductive and transistor T4 conductive, an applied positive sample voltage $+V_s$ will require more current to be drawn through resistor R*c* and diode D1 so that there will be an increased voltage drop across resistor R*c*, thereby giving rise to a negative output sample voltage at output terminal *t6* so that polarity reversal is effected; whereas, with transistor T3 conductive and transistor T4 nonconductive, an applied positive sample voltage $+V_s$ will require less current to be drawn through resistor R*c* and diode D2 so that there will be a decreased voltage drop across resistor R*c*, thereby giving rise to a positive output sample voltage at terminal *t6* so that the polarity of the applied sample voltage is unchanged. The diodes *d3* and $d^4$ function in respect of positive-going and negative-going output voltages, respectively, to clamp these output voltages to limiting maximum values which may otherwise be exceeded if sample voltages of excessive magnitude were applied at terminal *t1*.

In view of the circuit operations just described it will be evident that the ability of the circuit arrangement of FIG. 1 to reverse the polarity of applied electrical waveform sample voltages $\pm V_s$ with a satisfactory degree of accuracy will depend upon the circuit parameters being such that the resistor R*b* will always pass a constant current of value of $2I_b$. In particular, it has been found that the accuracy of the circuit arrangement depends upon the transistors T1 and T2 being specially selected so as to have nearly the same betas. Also, the supply voltage $+V_2$ needs to be very large compared with the variation of the potential at the emitter of transistor T2 in order to maintain the current passing through resistor R*b* at the required value $2I_b$. Furthermore, some of the signal current $\pm I_s$ is lost through the resistor R*b*.

Figure 2:
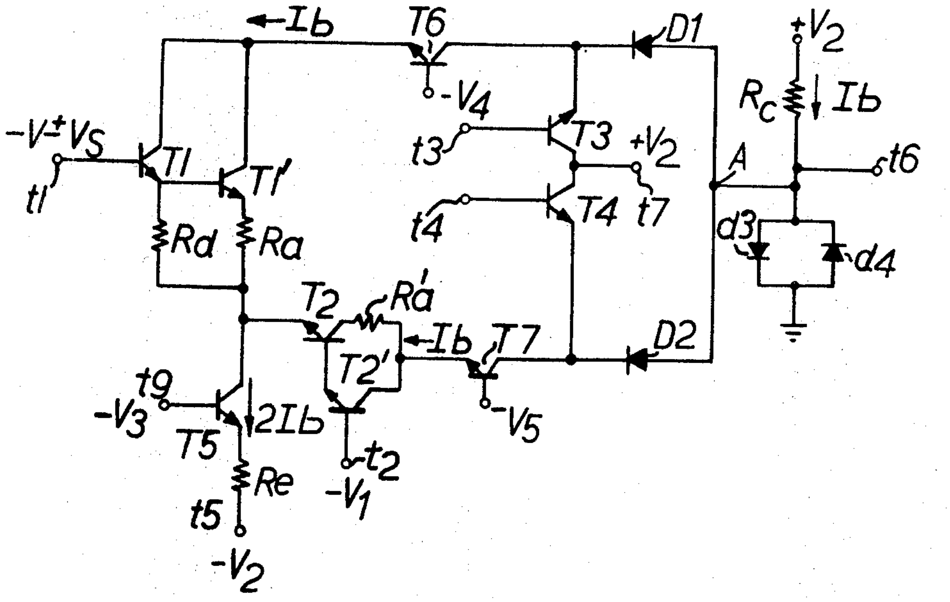
FIG. 2 shows another form of circuit arrangement conforming to the invention.

A satisfactory degree of accuracy in the operation of the circuit arrangement may be more readily attained in practice by replacing each of the transistors T1 and T2 by two transistors connected in the so-called Darlington connection, and by using a common base transistor in place of the resistor R*b* to maintain the current $2I_b$ constant. A circuit arrangement as shown in FIG. 2 is then formed. In this circuit arrangement, transistors T1 and T1′, which are connected in the so-called Darlington connection, replace transistor T1 in FIG. 1 and transistors T2 and T2′, which likewise are connected in the so-called Darlington connection, replace the transistor T2 in FIG. 1. Also a common base transistor T5 is provided in place of the resistor R*b* in FIG. 1, this transistor T5 having its emitter connected to terminal *t5* through an emitter resistor R*e* and its base connected to a further terminal *t9* to which is applied a reference voltage $-V_3$ appropriate for maintaining the transistor T5 conductive. The circuit arrangement of FIG. 2 operates in the same manner as that described for the circuit arrangement of FIG. 1. However, it was found that the speed of response of the emitter follower formed by transistors T1 and T1′ tended to be slow in the negative direction due to the limited current in transistor T1 being unable to charge the input capacitance of transistor T1′. This tendency is corrected by inserting resistor R*d* in the Darlington connection to increase the current through transistor T1, the combined $\beta$ of the two transistors T1 and T1′ being maintained by using a transistor with a higher $\beta$ for the transistor T1 than for the transistor T1′.

The circuit arrangement of FIG. 2 also includes two further transistors T6 and T7, without which the arrangement may not function with the required accuracy due to variation of base-emitter voltage drops of transistors T1′ and T2′ with temperature and hence with dissipation. This may be explained as follows with reference to FIG. 1. Let transistor T4 be conducting and transistor T3 be nonconducting so that the dissipation of transistor T2 is high and its base-emitter voltage drop for a given current is low due to the increased operating temperature. Conversely, in this circumstance, the dissipation of transistor T1 is low and its base-emitter voltage drop for a given current is consequently high. If the conditions of transistors T3 and T4 are now reversed the dissipations of transistors T1 and T2 are inter-changed, and even if an input voltage at terminal *t*1 is constant at a magnitude —V, a variation in output current at terminal *t*6 is detectable due to the change of voltage applied to resistor R*a*. In the circuit arrangement of FIG. 2 the two transistors T6 and T7 remove this effect, those transistors being connected as common base-buffers in the collector circuits of transistors T1 and T2 respectively and serving to shield the respective ones of those latter transistors from the variation in dissipation due to the operation of the current steering transistors T3 and T4. A resistor R*a*′ of the same magnitude as the resistor R*a* is also inserted in the collector circuit of transistor T2 and the voltages adjusted so that the expression $$V_1-V_2+V_4=0$$

is satisfied. These conditions ensure that the dissipations of transistors T1′ and T2′ are equal irrespective of input voltage level at terminal *t*1, thus ensuring linear performance of the circuit arrangement. With the circuit arrangement of FIG. 2, an accuracy of 0.1% difference between electrical waveform sample voltages passed without polarity change and those passed with polarity change can be achieved.

Figure 3:
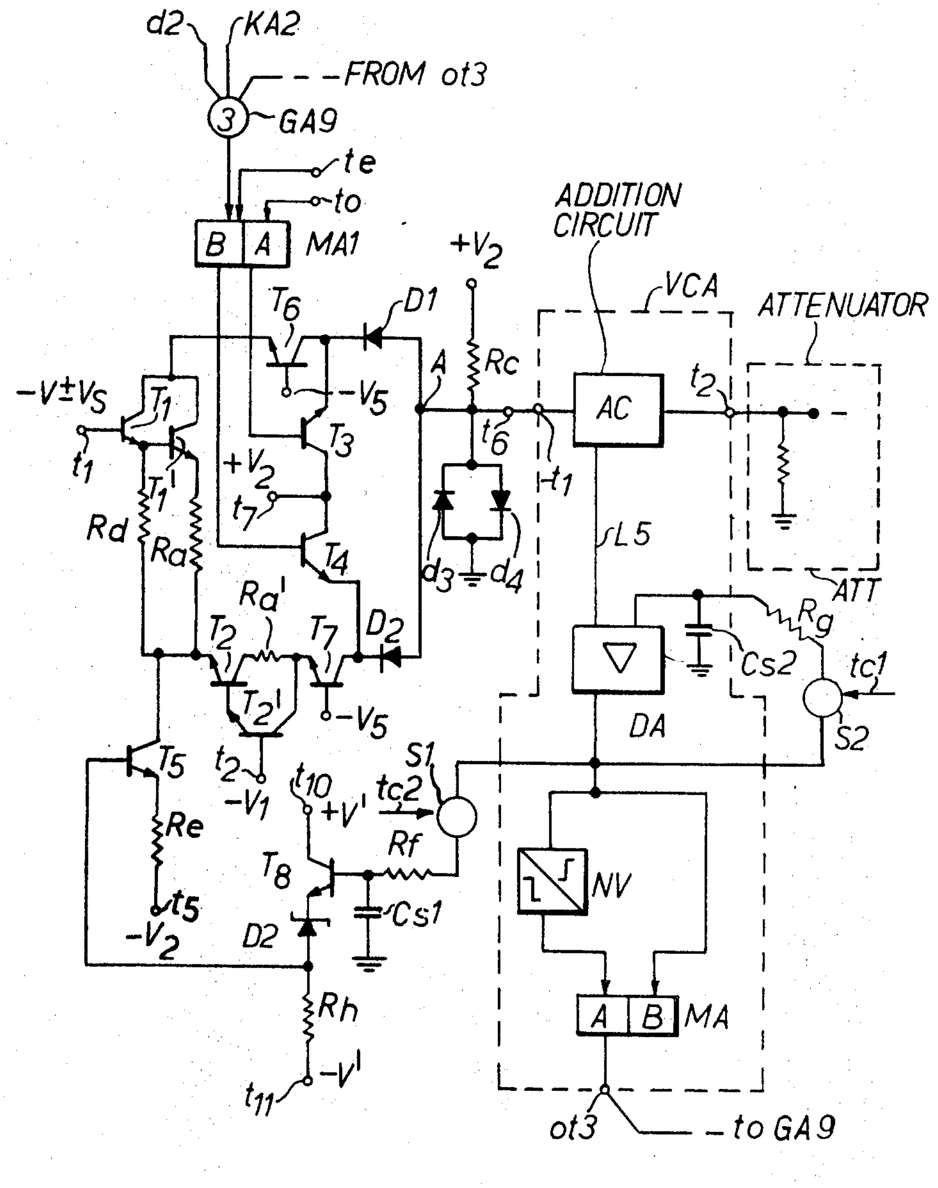
FIG. 3 shows the application of the circuit arrangement of FIG. 2 to the sending-end arrangement of the P.C.M. transmission arrangement together with associated drift correction elements.

FIG. 3 shows the application of the circuit arrangement of FIG. 2 to the sending-end arrangement of the P.C.M. transmission arrangement, together with associated drift correction elements. In this sending end arrangement, it is required that all received electrical waveform sample voltages are applied as positive sample voltages to a terminal +*t*1 of a voltage comparator arrangement VCA, irrespective of whether the sample voltages are originally of positive or of negative polarity. For the polarity reversing circuit arrangement to achieve this, transistor T3 has to be conductive and transistor T4 non-conductive in respect of sample voltages of positive polarity so that these sample voltages are passed without change of polarity to terminal +*t*1, whereas transnistor T3 has to be non-conductive and transistor T4 conductive in respect of sample voltages of negative polarity so that these latter sample voltages are passed with a change of polarity to terminal +*t*1. To this end, there is provided in the sending-end arrangement a bistable trigger circuit MA1 which controls the conductive states of the two current steering transistors T3 and T4. At the beginning of a channel time period in which electrical waveform sample voltages are to be encoded for transmission, the circuit MA1 is on the "A" condition in which it renders transistor T3 conductive and transistor T4 nonconductive. Thus a sample voltage applied at terminal *t*1 will pass without change of polarity, irrespective of whether it is of positive or of negative polarity, to terminal +*t*1 of the voltage comparator arrangement VCA. In the arrangement VCA, an addition circuit AC is effecive to produce on a wire L5 a resultant voltage which is of the same polarity as the algebraic sum of any voltages applied at terminals +*t*1 and −*t*2. At the beginning of a channel time period no voltage is applied at terminal −*t*2 from attenuator ATT, so that the voltage appearing on wire L5 has the same polarity as the sample voltage applied at terminal +*t*1. If this sample voltage is of positive polarity, then elements DA, NV and MA, which constitute a polarity indicator circuit within the arrangement VCA, do not produce any effective output at terminal *ot*3, so that no action is taken within the polarity reversing circuit arrangement and the applied positive sample voltage persists at terminal +*t*1 as a positive sample voltage, as is required. If, on the other hand, the sample voltage applied at terminal *t*1 and passed to terminal +*t*1 is of negative polarity, then the resultant negative voltage on wire L5 causes the polarity indicator circuit to produce an effective output at terminal *ot*3, this output being applied to a gate GA9 which controls the input to the B side of circuit MA1. Within the channel time period concerned and during an interval before sample encoding commences, gate GA9 also has applied to it pulses *d*2 and KA2 as indicated, with the result that this gate opens and its output sets circuit MA1 to the B condition. In the B condition, the circuit MA1 renders transistor T3 nonconductive and transistor T4 conductive, so that the applied negative sample voltage now appears as a positive sample voltage at terminal +*t*1 and persists thereat for the remainder of the channel time period concerned so that it is encoded as a positive sample, as is required.

Where the polarity reversing circuit arrangement is direct-coupled for any particular application, for example as in its application to P.C.M. transmission arrangements as just considered, accurate drift correction will normally be required in order to ensure reliable operation. Drift correction has to be effected in respect of both the polarity reversing and the nonreversing modes of operation of the circuit arrangement, and is achieved as follows in the particular application of the circuit arrangement shown in FIG. 3. There is provided in FIG. 3, for the purposes of drift correction, a further emitter-follower transistor T8 which controls the reference voltage applied to the base of the common base transistor T5, a first D.C. storage capacitor C*s*1 which is connected between earth and the base of transistor T8, a second D.C. storage capacitor *Cs*2 which is connected between earth and a terminal *t*12 of the voltage comparator arrangement VCA, a first current switch S1 which is connected in series with a resistor R*f* between the output of differential amplifier DA and the base of transistor T8, and a second current switch S2 which is connected in series with a resistor R*g* across amplifier DA.

In the organisation of the P.C.M. transmission arrangements, the first channel time period of each channel pulse cycle, which defines each frame of channels, is allocated to drift correction, and what may be termed even and odd occurrences of the first channel time period are used in turn to drift correct alternately in respect of the polarity reversing mode of operation and the nonreversing mode of operation of the circuit arrangement. For drift correction, the amplifier DA of the voltage comparator arrangement VCA is time shared in the odd and even drift correction periods as follows, it being appreciated, of course, that no sample voltages are present at terminal *t*1 when drift correction is being carried out. In each even drift correction period, the bistable circuit MA1 is set to the B condition by the application of a suitable signal at a terminal *te*, so that transistor T3 is nonconductive and transistor T4 conductive. Also, in each even period, switch S2 is operated by a suitable input applied to it from a terminal *tc*1. With transistor T3 nonconductive, the diode D1 is forward biased so that any input voltage offset at terminal *t*1 gives rise to a change of current through diode D1 to cause a drift voltage to appear at terminal *t*6. As a result of this drift voltage, a spurious output is produced by the amplifier DA, and this spurious output is fed via switch S2 and resistor R*g* to charge the capacitor C*s*2. In this way the reference level at the input of the differential amplifier DA is drift corrected, in accordance with the charge on capacitor Cs2, to the D.C. level at terminal +*t*1. In each odd drift correction period, the bistable circuit MA1 is set to the A condition by the application of a suitable signal at a terminal *to*, so that transistor T3 is conductive and transistor T4 nonconductive. Also, in each odd period, switch S1 is operated by a suitable input applied to it from a terminal *tc*2. With transistor T4 nonconductive, the diode D2 is forward biased so that any input voltage offset at terminal *t*1 gives rise to a change of current through diode D2 to cause a drift voltage to appear at terminal *t*6. As a result of this drift voltage, a spurious output is again produced by amplifier DA, but in this instance this spurious output is fed via switch S1 and resistor R*f* to charge the capacitor C*s*1. The resultant charge on the capacitor C*s*1 changes the extent of conduction of transistor T8 such that the reference voltage applied to the base of transistor T5 so modifies the conduction of this transistor that the current flowing through the diode D2 changes sufficiently to correct the drift potential at terminal *t*6 back to the value it has during even drift correction periods. A Zener diode DZ is provided for direct coupling purposes in the emitter circuit of the transistor T8, which transistor, as shown, also has an emitter resistor R*h* and is energised by a supply voltage $+V'/-V'$ from supply terminals *t*10 and *t*11. It is to be appreciated that since a circuit arrangement conforming to the invention provides an accurate current output in response to a voltage input, the arrangement VCA can be organised, with advantage, to function in terms of current weights rather than voltage magnitudes in the performance of sample encoding operations.

I claim:

1. A circuit arrangement for selectively reversing the polarity of electrical wave-form samples, and comprising constant current means; a load resistor connected to said constant current means by first and second parallel paths, said constant current means maintaining the total current fed thereto from the two paths constant; a first current steering transistor connected between a current source and said first path and a second current steering transistor connected between said current source and said second path, each said current steering transistor, when conductive, supplying a current to said constant current means of a value half that of the total constant current fed to said constant current means and, when conductive, inhibiting the supply of current to the corresponding path of said first and second paths by said load resistor; said arrangement further comprising input transistor means connected to said constant current means in said first path for supplying, responsive to an applied electrical wave-form sample voltage, a sample current to said constant current means, the voltage across said load resistor being responsive to the sample current in said first path under conditions wherein said first and second current steering transistors are respectively nonconductive and conductive, and to a current in said second path of a magnitude equal to said sample current and of an inverse polarity to said sample current under conditions wherein said first and second steering transistors are respectively conductive and nonconductive.

2. A circuit arrangement as claimed in claim 1, wherein said constant current means comprises a resistance to which said first and second current paths are connected in common.

3. A circuit arrangement as claimed in claim 1, wherein said constant current means comprises a transistor connected in common base configuration.

4. A circuit arrangement as claimed in claim 1, wherein said input transistor means comprises two transistors connected in the so-called Darlington connection.

References Cited

UNITED STATES PATENTS

| | | | |
|---|---|---|---|
| 3,207,986 | 9/1965 | Bailey | 179—15 |
| 3,222,608 | 12/1965 | Chick | 330—14 |

DONALD D. FORRER, Primary Examiner

D. M. CARTER, Assistant Examiner

U.S. Cl. X.R.

307—253, 262